Oct. 29, 1968  R. A. WELCH, SR  3,408,479
ELECTRIC SPACE HEATER
Filed Aug. 16, 1965  2 Sheets-Sheet 2
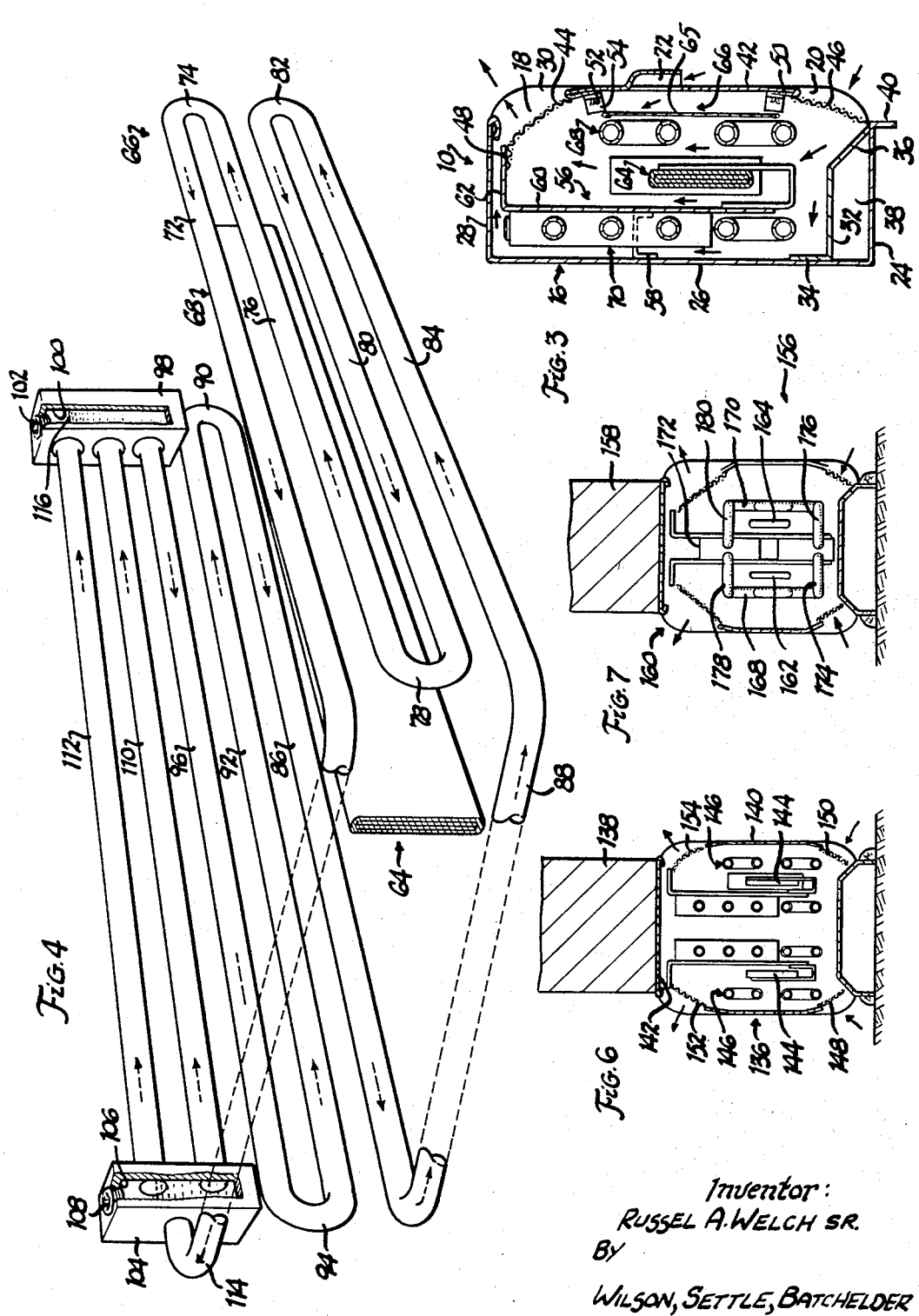
Inventor:
RUSSEL A. WELCH SR.
By
WILSON, SETTLE, BATCHELDER
ATT'YS. & CRAIG

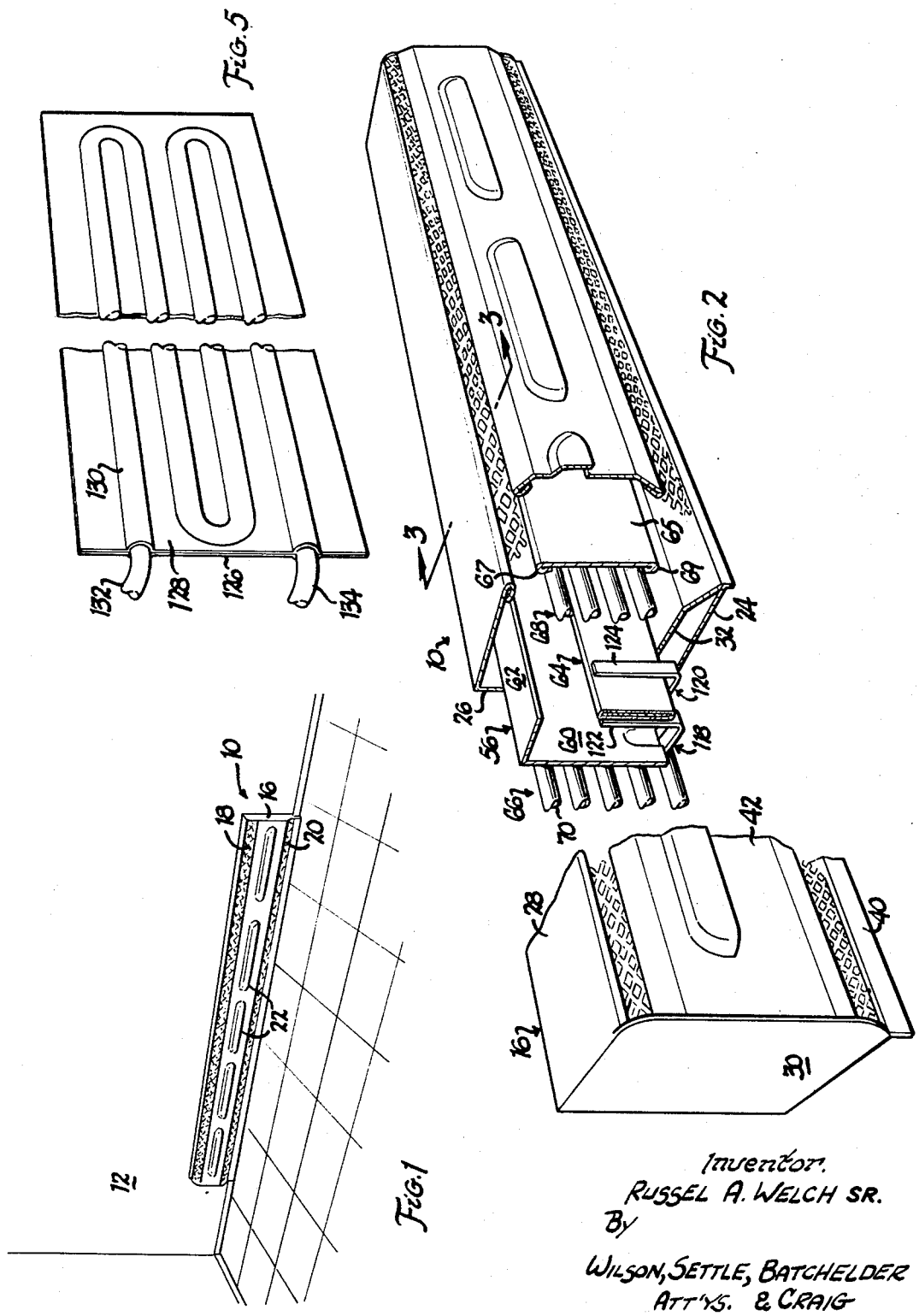

United States Patent Office 3,408,479
Patented Oct. 29, 1968

3,408,479
ELECTRIC SPACE HEATER
Russel A. Welch, Sr., St. Clair Shores, Mich., assignor of forty-five percent to Eugene A. Cassroll, Grosse Pointe, and five percent to Paul G. Hogue, Mount Clemens, Mich.
Filed Aug. 16, 1965, Ser. No. 480,054
6 Claims. (Cl. 219—365)

ABSTRACT OF THE DISCLOSURE

A convection-type space heater unit is provided with liquid filled heat absorbing cells disposed on opposite sides of a thermostatically controlled air heating element. The cells are connected for free circulation of liquid from one to the other. In one arrangement, one cell includes spaced manifolds interconnected by conduits providing spaced parallel flow paths therebetween. In another arrangement, the cells each comprise plate members incorporating means defining a sinuous liquid circulation path. Furthermore, a space heater of the above type is combined with a housing mounted in a wall between adjoining rooms to simultaneously heat both rooms.

---

This invention relates to space heaters, and more particularly to heaters of the convection flow type utilizing in combination a radiant heating element and a liquid filled cell wherein a portion of the radiant energy produced by the heating element is absorbed by the liquid cell and subsequently conveyed by convection to air flowing through the heater.

My present invention is an improvement of the heater disclosed in my copending application Ser. No. 154,721, filed Nov. 24, 1961, now Patent No. 3,253,123, granted May 24, 1966.

Electric heaters in the past have operated on the principle of heating partly by convection and partly by direct radiation into the area to be heated. Heating by radiation is inefficient because much radiant heat is lost by passing through windows, doors and other glass openings. Additionally, when such heaters are turned off because the room temperature has risen to a predetermined comfort level, there is a sharp break in heating, resulting in discomfort due to the loss of the radiated heat.

The present invention solves this problem by providing an electrical heater which heats substantially by convection principles and in which a liquid heat sink is provided to continue heating when the heater is cycled to the "off" position to result in sustained comfort.

It is thus an important object of the present invention to provide a space heater of the electrically actuated type wherein radiant energy produced by an electrically actuated heating element is transferred to the space being heated substantially by convection rather than direct radiation.

Another object of the invention is to provide an electrical heating unit wherein the radiant energy produced by the heating element is partially absorbed by a fluid cell.

A further object is to provide a fluid cell formed of a low cost sinuous tubular construction.

A still further object is to provide a fluid cell which not only acts as a heat sink but also serves to insulate the electrical heating element from its enclosing casing to thereby reduce the temperature of the casing and permit operation of the heating element at a relatively high temperature.

Other objects of this invention will appear in the following description and appended claims, reference being had to the accompanying drawings forming a part of this specification wherein like reference characters designate corresponding parts in the several views.

In the drawings:
FIGURE 1 is a perspective view of one embodiment of the heater of the present invention mounted on a supporting wall surface;
FIGURE 2 is a perspective view of the heater with parts broken away for the purpose of clarity;
FIGURE 3 is a sectional view taken substantially along the line 3—3 of FIGURE 2 looking in the direction of the arrows;
FIGURE 4 is an exploded perspective view illustrating the liquid cell and electrically actuated heating element;
FIGURE 5 is a perspective view of an alternate tubular construction;
FIGURE 6 is an end sectional view of a dual heater unit mounted in a wall to provide heat for two different rooms; and
FIGURE 7 is an end view of an alternate form of a dual heater unit mounted in a wall.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it will be noted that the heater 10 of the present invention is adapted for mounting on the wall 12 of a dwelling. The heater 10 is mounted only a short distance above the floor 14 so that heat from the unit will rise to heat the room. It will be noted that the heater unit includes an elongated housing 16 having an elongated upper opening 18, elongated lower opening 20 and spaced apart openings 22 intermediate the upper and lower openings for the circulation of air therethrough.

Referring to FIGURES 2 and 3, it will be noted that the housing 16, which is constructed of sheet metal, has a generally rectangular cross section. The housing has a bottom wall 24, back wall 26 and top wall 28. The ends of the unit are closed by end walls 30.

An elongated plate 32 is provided within the housing and extends the length thereof. The plate 32 has one flange 34 whch is secured to the back wall 26 and a turned down portion 36 which extends into abutment with the bottom wall 24. The bottom wall 24 and plate 32 define an elongated cavity 38. The cavity 38 may serve as an enclosure for the electrical wiring of the unit and also acts to insulate the bottom of the heater from the floor. With respect to insulation, it will be noted that the front edge 40 of the bottom wall 24 is turned down. Thus the heater cannot be mounted directly on the floor but must be mounted in a manner spaced therefrom. The space between the heater and the floor also serves to insulate the heater from the floor.

A detachable front cover 42 completes the housing structure. The front cover 42 defines, with the top wall 28 and bottom wall 24, the upper and lower openings 18, 20. Screen elements 44, 46 are provided to guard the openings 18, 20 to prevent a person inserting his hand or fingers into the heater when the heater is in use. The screen 44 is attached to a plate 62 of a baffle 56 along the edge 48. The lower screen 46 is attached to the front cover 42 along the edge 50.

As will be noted in FIGURE 3, the front cover 42 is provided with spring clips 52 which engage openings in brackets 54 mounted on the end walls 30 for detachable securement of the front cover to the housing 16.

As will be noted in FIGURES 2 and 3, the L-shaped baffle 56 is positioned centrally of the housing 16. The baffle is secured to the back wall 26 by means of brackets 58. The baffle 56 comprises a vertically extending plate portion 60 and a horizontally extending plate portion 62. The baffle 56 serves to shield the back wall 26 against direct radiation of heat and also serves to divide the interior of the housing 16 into two airflow paths. Additionally, the baffle serves to mount an electrical heating element 64 and a fluid cell structure 66.

The heating element 64 and fluid cell structure 66 are illustrated in FIGURE 4. The fluid cell structure 66 comprises front and rear cells 68 and 70. The fluid cell, as will be noted, is formed of horizontally extending tube portions which are interconnected in a sinuous manner to form a unitary structure.

The front cell portion 68 comprises an upper tubular portion 72 which has a reverse bend at 74 leading into a second tubular portion 76 therebeneath which is substantially parallel thereto. The second tubular portion has a reverse bend at 78 leading into a third tubular portion 80 which extends back towards the bend 74. The tubular portion 80 has a reverse bend at 82 which leads into the lowermost tubular portion 84 which extends back towards the bend 78. The tubular portions are substantially parallel to each other.

The rear cell portion 70 has a construction generally similar to the front cell portion and comprises a lowermost tubular portion 86 which is directly connected to the lowermost tubular portion 84 of the front cell portion by means of a tubular connection 88. At the other end, tubular portion 86 has a reverse bend 90 which leads into the next tubular portion 92. The tubular portion 92 has a reverse bend at 94 which leads into the third tubular portion 96. Tubular portion 96 extends back towards the bend 90 and terminates in a vertically extending manifold 98.

The manifold 98 is a metallic block having a vertical passageway 100 extending from the top surface thereof to a point slightly beneath the tubular portion 94. The upper end of the passageway 100 is threaded and receives a threaded plug 102 which seals the manifold. A second manifold 104 having the same general construction is provided at the opposite end of the rear tubular cell portion 70. Manifold 104 has a central passageway 106 and a threaded plug 108.

A pair of spaced apart tubular sections 110, 112 extend between the manifolds 98, 104 above the tubular portion 96.

The fluid cell 66 is substantially filled with a liquid, such as water. The cell may be filled by removing the plugs 102, 108 and pouring liquid into the manifold. The liquid is added at room temperature to a level sufficiently high that upon heating of the unit to operating temperatures, the liquid will expand and completely fill to the top of the tubular section 112, which as will be noted, is slightly elevated above the uppermost tubular portion 72 of the front cell portion 68. The tubular portion 72 is connected to the manifold 104 by means of tubular portion 114. It will be noted that tubular portion 114 is located in the manifold 104 at a point slightly below the tubular section 112.

After the fluid cell has been filled to the desired level 116, the heating element 64 is energized, causing the liquid in the cell to be heated and to expand. As the liquid expands, it will rise and drive out any air or excess liquid through the openings in the manifolds 98, 104. When the unit has reached maximum operating temperature, the plugs 102, 108 are replaced. A sealing compound is preferably applied to the plugs to provide a fluid tight seal. When the heating unit 64 is deenergized, the liquid in the cell will of course cool and contract. Contraction of the liquid will result in a partial vacuum in the space above the liquid level 116. Subsequent reheating of the unit will cause expansion of the liquid to again fill the manifold. However, there will be no gurgling or popping noises resulting from circulation of the liquid within the tubular cell because of the absence of entrapped air and the fact that the rise in liquid level is accommodated in the uppermost portions of the tubular section 112 and manifolds 98, 104.

Referring again to FIGURES 2 and 3, it will be noted that the fluid cell 66 is mounted in place by securing the rear cell portion 70 directly to the rear face of the vertical plate 60 of the baffle 56. This may be accomplished by any suitable means such as welding or brazing. The front cell portion 68 extends between the baffle 56 and the front cover 42. The heating element 64 is also secured to the vertical plate 60 of the baffle by means of a suitable bracket and spring mounts (not shown).

A front baffle 65 having turned upper and lower edges 67, 69 is secured to tubular portions 72, 84 of the front cell portion 68 as by brazing. The baffle 65, together with baffle 56, create a chimney action in the heater for the upward flow of air. The baffle 65 also controls heat dissipation from the element 64 causing more heat to be held in the front cell portion 68 and reducing the temperature of the front cover 42.

Brackets 118, 120 are provided on the lower edge of the baffle plate 60 and have legs 122, 124 which are spaced apart and extend on opposite sides of the heating element 64. These brackets maintain the heating elements in the desired position by limiting forward or backward movements thereof resulting from expansion or contraction of the heating element upon heating and cooling thereof. The heating element may be any conventional unit, the element shown being a helically wound resistant strip insulated by means of, for example, mica.

In operation of the invention, the heating element 64 is electrically energized. Suitable thermostatic control means may be provided to control energization and deenergization of the heating element. The heating element, which lies generally centrally between the front liquid cell portion 68 and vertical plate 60 of the baffle 56, radiates heat into the baffle and into the front portion of the cell and baffle 65. Thus, both the front and rear portions of the housing are effectively shielded from heat radiation to thus run at a relatively cool temperature.

When the heating element 64 begins to heat up, the surrounding air is heated and moves upwardly and out of the unit through the upper opening 18. Simultaneously, cooler air is drawn into the lower opening 20. The heater unit thus provides immediate comfort when it is energized.

Radiation of heat from the heating element 64 into the front cell portion 68 causes the liquid therein to be heated. The front cell portion, after being heated, also acts to heat the surrounding air in the same manner as the heating element.

As the temperature of the liquid in the front cell portion increases, fluid flow from the front cell portion to the rear cell portion commences as illustrated by the dotted arrows in FIGURE 4. The warm liquid, which tends to rise, passes out of tubular portion 72 and into manifold 104, forcing circuliation of liquid from the rear cell portion 70 back to the front cell portion 68 as indicated. In this manner, the liquid in the rear cell portion manifold 104, forcing circulation of liquid from the rear cell portion becomes a heat radiating source and heats the surrounding air causing convection flow through the rear portion of the heater unit between the baffle 56 and back housing wall 26.

Therefore, when the unit is in full operation, as illustrated by the solid arrows in FIGURE 3, there are three air paths through the unit. Air is drawn into the lower opening 20. This air separates into one stream passing upwardly over the heating element 64, front cell portion 68, and baffle 56. A portion of the entering air follows a path towards the rear of the housing 16 and on up through the space defined by the back wall 26 and plate 60 of baffle 56. This air is heated by the rear cell portion 70 and tends to cool the back wall 26 and baffle 56. Air passing upwardly through this path exits through the space defined by the horizontal plate 62 of the baffle 56 and the top wall 28 of the housing. The third air path is through the middle openings 22 in the front cover 42. This air passes over a portion of the baffle 65 and mixes with the air passing upwardly from the lower opening 20 to form a single air stream passing through the upper opening 18. This air stream meets the air stream passing through the horizontal baffle plate 62 and top wall 28 to form an emerging air stream from the heater which is directed away from the wall upon which the heater is mounted. This is desirable in that it tends to keep the warm air stream for direct impingement upon the wall surface thus reducing wall streaking above the heater.

The provision of the fluid cell structure 66 of the present invention in conjunction with the heating element 64 results in several advantages over the use of a heating element by itself. Firstly, the front cell portion 68 of the fluid cell acts to intercept radiation from the heating element to thus shield the front of the heater housing. The use of a fluid cell as opposed to a regular baffle is advantageous in that the volume of heat which may be absorbed by the fluid cell is considerably higher than that which may be absorbed by a baffle plate, this volume being further expanded by the provision of the rear cell portion 70.

As a consequence of this arrangement, the heating element 64 may be run at higher temperature than the heating element of conventional heaters.

A further advantage of the fluid cell construction resides in that the fluid cell acts as a heat sink. When the heater is turned off because the temperature in the room being heated has risen to the desired point, the fluid cell continues to provide heat for a period of time. As a result, the heating element 64 need not be energized as frequently as is the case when a heat sink is not provided.

The tubular construction of the fluid cell of my present invention is advantageous over a construction wherein the fluid cell is a single envelope enclosing the liquid to be heated as shown in my aforementioned copending application. Firstly, a tubular construction is less expensive to manufacture than an envelope construction because the tubes may be purchased as stock items and the tooling for bending the tubes is relatively simple and inexpensive. Additionally, the flow pattern in a tubular construction is exactly defined by the tubes so that it may be closely controlled. Another advantage of the tubular construction for the same volume of liquid is that the surface area of the tubes for contacting and heating surrounding air is much greater than is the case with a single envelope structure. Finally, the tubular construction is of a lighter weight because thin wall tubes can be used in the construction as opposed to the relatively thick walls necessary in an envelope structure.

An alternate construction for the fluid cell is illustrated in FIGURE 5. As shown in FIGURE 5, a pair of plates 126, 128 are secured together along one face thereof. Mating indentations are provided in each of the plates to define the sinuous tubular pattern 130. The upper and lower open ends of the tubular structure are connected to a similar rear tubular cell by means of connecting tubes 132, 134. A convenient means for manufacturing the FIGURE 5 fluid cell is the trademarked "Roll-Bond" process. In this process, the plates 126, 128 are swetted together in fluid-tight engagement with a pattern of linen therebetween. The pattern acts as a balloon and is subsequently blown up to the final desired tubular shape as illustrated. Alternately, the plates 126, 128 may be formed in a die and subsequently secured together in a fluid-tight fashion.

The FIGURE 5 construction has the advantage of being relatively inexpensive to manufacture and also providing a baffle construction between the tubes. This baffle construction operates to shield the walls of the housing from any direct radiation from the heating element.

FIGURE 6 illustrates an embodiment wherein a dual heater 136 is provided in a wall 138 to heat two different rooms. The heater 136 has a single housing 140 which is mounted in opening 142 in the wall 138. If desired, the housing 140 may be designed as a built-in unit of the type forming an integral part of the wall.

Enclosed within the housing 140 are separate heating units each comprising a heating element 144 and fluid cell 146 constructed in the manner previously described in connection with the embodiments of FIGURES 1–4.

As shown in solid arrows, air enters the housing 144 through lower openings 148, 150 and passes through the heating elements as before described and thence out of the upper openings 152, 154. There is no partition between the fluid cell 146. Thus air from each room will be intermixed to a certain extent. This will tend to equalize the temperatures of the two roms. If desired, a partition may be provided between the heating elements to afford closer individual room control. However, the absence of the partition has the advantage of extending the off cycle of one of the units as the result of receiving heated air from the other unit to thus give an overall increase in efficiency.

FIGURE 7 illustrates another embodiment of a dual heater. In FIGURE 7, the dual heater 156 is mounted in a wall 158. The dual heater 156 includes a housing 160 in which two separate heating units are enclosed. The heating units comprise a pair of heating elements 162, 164, each designed to serve an adjacent room.

Each heating element 162, 164 is positioned next to a front fluid cell 168, 170. The fluid cells 168, 170 have the coil construction described in connection with the front cell portion 68 of FIGURES 1–4.

The FIGURE 7 construction differs from the FIGURE 6 construction in that a common fluid cell 172 is provided to serve both of the front cells 168, 170. The fluid cell 172 comprises an elongated single envelope enclosing a body of liquid as described in my aforementioned copending application. The lowermost portion of fluid cells 168, 170 are connected to the lowermost portion of tubular cell 172 by means of conduits 174, 176. The uppermost portion of these cells is connected to cell 172 by means of conduits 178, 180. Fluid flow between the cells 168, 170 and cell 172 is substantially as heretofore described.

The FIGURE 7 construction comprises less space than the FIGURE 6 construction because only a single cell 172 is provided between the two cells 168, 170. The construction also has the advantage in that if either side of the heater is in operation, the cell 172 is heated. A portion of the heat from cell 172 is distributed to the side not operating, causing some heat to be delivered to the non-operating side. This is advantageous in that less cycling of the dual unit is required to maintain both rooms at the desired temperature.

Having thus described my invention, I claim:

1. In a space heater of the convection flow type, an elongated electric heating element, a first liquid cell positioned in alignment along one side of said heating element in radiation-absorbing relation thereto, a second liquid cell positioned in alignment along the other side of said heating element, said second cell including spaced manifolds with a portion of each manifold extending above the top of said first cell, conduit means providing parallel flow paths between said manifolds, a first fluid conduit extending from the upper portion of one end of said first cell to one manifold, and a second fluid conduit extending from the lower portion of the other of said manifolds into the lower portion of one end of said first cell.

2. A space heater as defined in claim 1, further including a fill opening in the top of one of said manifolds.

3. A space heater as defined in claim 1, further including a fill opening in the top of each manifold and removable sealing means in each of said openings.

4. A space heater as defined in claim 1, further including means shielding said second cell from said heating element.

5. A space heater as defined in claim 1, in which said second fluid conduit includes a portion defining a series flow path located below said manifolds.

6. A space heater adapted to be mounted in an opening in a wall between adjoining rooms, said heater comprising a housing mounted in said opening, said housing having air flow openings on each side of the wall, a pair of heater units within the housing each for servicing one of said rooms, each of the heater units comprising an elongated radiant heating element, a first liquid cell positioned in alignment along one side of said heating element to receive radiation therefrom, a second liquid cell positioned in alignment along the other side of said heating element, means shielding said second cell from said heating element, and means connecting the first and second cells in convection fluid flow relation.

References Cited

UNITED STATES PATENTS

| | | | |
|---|---|---|---|
| 1,073,813 | 9/1913 | Neiman. | |
| 1,863,882 | 6/1932 | Scharf | 219—365 X |
| 2,732,615 | 1/1956 | Sandberg | 29—157.3 |
| 3,004,329 | 10/1961 | Peterson et al. | 29—157.3 |
| 3,253,123 | 5/1966 | Welch | 219—378 X |

ANTHONY BARTIS, *Primary Examiner.*

UNITED STATES PATENT OFFICE
CERTIFICATE OF CORRECTION

Patent No. 3,408,479                                                                 October 29, 1968

Russel A. Welch, Sr.

It is certified that error appears in the above identified patent and that said Letters Patent are hereby corrected as shown below:

Column 2, line 46, "whch" should read -- which --. Column 4, line 57, "circuliation" should read -- circulation --; line 60, "manifold 104, forcing circulation of liquid from" should read -- 70 becomes heated. When this liquid is heated, --.

Signed and sealed this 17th day of March 1970.

(SEAL)
Attest:

Edward M. Fletcher, Jr.                                WILLIAM E. SCHUYLER, JR.
Attesting Officer                                                     Commissioner of Patents